US008421951B1

(12) United States Patent
Wang et al.

(10) Patent No.: US 8,421,951 B1
(45) Date of Patent: Apr. 16, 2013

(54) LIQUID CRYSTAL DISPLAY WITH BACKLIGHT FRAME STRUCTURE

(71) Applicant: AU Optronics Corporation, Hsinchu (TW)

(72) Inventors: Chung-Min Wang, Hsinchu (TW); Chia-Hsin Chang, Hsinchu (TW); Ping-Fu Wang, Hsinchu (TW); Chia-Chang Tsai, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 0 days.

(21) Appl. No.: 13/707,207

(22) Filed: Dec. 6, 2012

Related U.S. Application Data

(62) Division of application No. 12/943,285, filed on Nov. 10, 2010, now Pat. No. 8,350,983.

(51) Int. Cl.
*G02F 1/1333* (2006.01)

(52) U.S. Cl.
USPC ............................................................ 349/58

(58) Field of Classification Search ...................... 349/58
See application file for complete search history.

(56) References Cited

U.S. PATENT DOCUMENTS

| 7,852,424 B2 * | 12/2010 | Sugawara ........................ 349/58 |
| 2006/0152664 A1 * | 7/2006 | Nishio et al. .................. 349/150 |

* cited by examiner

*Primary Examiner* — Richard Kim
(74) *Attorney, Agent, or Firm* — Morris Manning & Martin LLP; Tim Tingkang Xia, Esq.

(57) ABSTRACT

In one aspect of the present invention, an LCD includes a front frame having a flange and a rear cover having a flange defining a housing therebetween, a liquid crystal (LC) panel placed in the housing, a backlight positioned between the LC panel and the rear cover, and a backlight frame having a first engaging structure configured to receive the flanges of the front frame and the rear cover, and a second engaging structure configured to retain the backlight and the LC panel in the housing.

14 Claims, 4 Drawing Sheets

LIQUID CRYSTAL DISPLAY WITH BACKLIGHT FRAME STRUCTURE

CROSS-REFERENCE TO RELATED PATENT APPLICATION

This application is a divisional application of, and claims benefit of U.S. patent application Ser. No. 12/943,285, filed Nov. 10, 2010, entitled "LIQUID CRYSTAL DISPLAY WITH BACKLIGHT FRAME STRUCTURE," by Chung-Min Wang, Chia-Hsin Chang, Ping-Fu Wang, and Chia-Chang Tsai, which status is allowed, the disclosure of which is hereby incorporated herein in its entirety by reference.

FIELD OF THE INVENTION

The present invention relates generally to a liquid crystal display (LCD), and more particularly to an LCD with a backlight frame structure having a front groove and a rear groove configured to receive a front frame and a rear cover, respectively, of the LCD and retain them therein.

BACKGROUND OF THE INVENTION

Liquid crystal display (LCD) is commonly used as a display device because of its capability of displaying images with high quality while consuming little power.

Typically, as shown in FIG. 4, an LCD 10 includes a front frame 11, a liquid crystal (LC) panel 13, a backlight module having a light source 14 and a light guiding plate 16, a backlight frame structure 15, a rear bracket 12, and a mounting frame 17, as shown in FIG. 4(b). The LC panel 13 is received in the front frame 11. The light guiding plate 16 is positioned between the LC panel 13 and the rear bracket 12. The light source 14 such as LED lights is provided at a side of the light guiding plate 16 for providing light to be transmitted through the light guiding plate 16 to the LC panel 13 for image displaying. Further, the LC panel 13 and the backlight module (14 and 16) are retained by the backlight frame structure 15 in a space defined between the front frame 11 and the rear bracket 12. The mounting frame 17 is provided at the rear bracket 12 for mounting the LCD 10 on an LCD housing. The front frame 11 is usually made of a metal material.

For such an LCD design 10, the front metal frame 11 needs to be cut at each corner 18, as shown in FIG. 4(c). However, because the cut surface at each corner is exposed, the front metal frame 11 may get rusting at the corners as the time goes. In addition, the corner cuts may cause a finger cut or injury when moving the LCD 10.

Therefore, a heretofore unaddressed need exists in the art to address the aforementioned deficiencies and inadequacies.

SUMMARY OF THE INVENTION

In one aspect of the present invention, an LCD includes a front frame having a body portion and a flange bent from the body portion and a rear cover having a body portion and a flange bent from the body portion. The rear cover and front frame spatially face each other to define a housing therebetween.

The LCD further includes a liquid crystal (LC) panel placed in the housing, a backlight positioned between the LC panel and the rear cover, and a backlight frame having a first engaging structure and a second engaging structure defining a frame body therebetween. The first engaging structure is configured to receive the flanges and of the front frame and the rear cover, and the second engaging structure is configured to retain the backlight and the LC panel in the housing.

In one embodiment, the first engaging structure has a head portion, a shoulder portion extending from the frame body, and a neck portion vertically connected between the head portion and the shoulder portion, thereby defining a first groove and a second groove between the head portion and the shoulder portion, the first groove separated from the second groove by the neck portion. The first and second grooves are configured to receive the flanges and of the front frame and the rear cover, respectively, such that the head portion is positioned outside the housing, while the shoulder portion is positioned inside the housing. In one embodiment, the head portion has at least one of an arc profile, a streamline profile, a sloped profile and an angled profile.

In another embodiment, the first engaging structure has a first horizontal portion, a second horizontal portion and a third horizontal portion spatially and horizontally arranged, and a first vertical portion and a second vertical portion spatially and vertically arranged. Each of the first, second and third horizontal portions has a first end and an opposite, second end. The first horizontal portion has at least one of an arc profile, a streamline profile, a sloped profile and an angled profile.

In one embodiment, the first vertical portion is connected between the second ends of the first and second horizontal portions to define a first groove therein, and the second vertical portion is connected between the first ends of the second and third horizontal portions to define a second groove therein. The first and second grooves are configured to receive the flanges of the front frame and the rear cover, respectively, such that the first horizontal portion is positioned outside the housing, while the third horizontal portion is positioned inside the housing.

In another embodiment, the first vertical portion is connected between the first ends of the first and second horizontal portions to define a first groove therein, and the second vertical portion is connected between the second ends of the second and third horizontal portions to define a second groove therein. The first and second grooves are configured to receive the flanges of the rear cover and the front frame, respectively, such that the first horizontal portion is positioned outside the housing, while the third horizontal portion is positioned inside the housing.

In one embodiment, the backlight frame is made of one or more elastic materials. The one or more elastic materials comprise plastic. One exemplary material comprises rubber. In one embodiment, the one or more elastic materials are paintable.

In one embodiment, the first engaging structure, the frame body and the engaging structure of the backlight frame are made of an identical elastic material or substantially different elastic materials.

In one embodiment, the backlight frame is integrally formed by injection molding.

In one embodiment, each of the front frame and the rear cover is made of metal or plastic.

In one embodiment, the backlight comprises a light guiding plate positioned in relation to the LC panel, a light source optically coupled to the light guiding plate and a driving circuit electrically coupled to the light source. The backlight may further include a plurality of optical films optically coupled the light guiding plate.

In addition, the LCD may also have a heat dissipating member positioned in contact with the driving circuit of the backlight and the rear cover.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
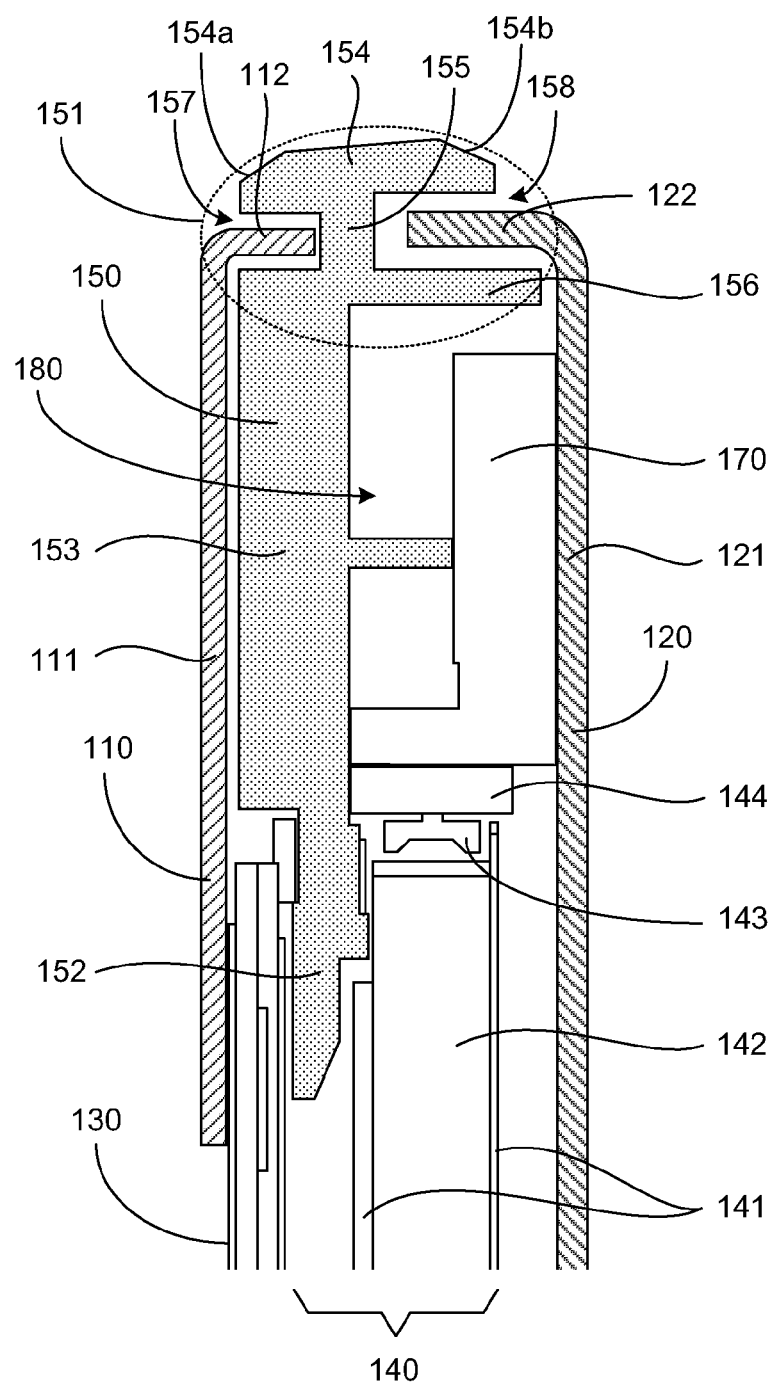
FIG. 1 shows schematically and partially a cross-sectional view of an LCD according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings in FIGS. 1-3. In accordance with the purposes of this invention, as embodied and broadly described herein, this invention, in one aspect, relates to an LCD with a backlight frame structure having a front groove and a rear groove configured to receive a front frame and a rear cover, respectively, of the LCD and retain them therein.

Figure 2:
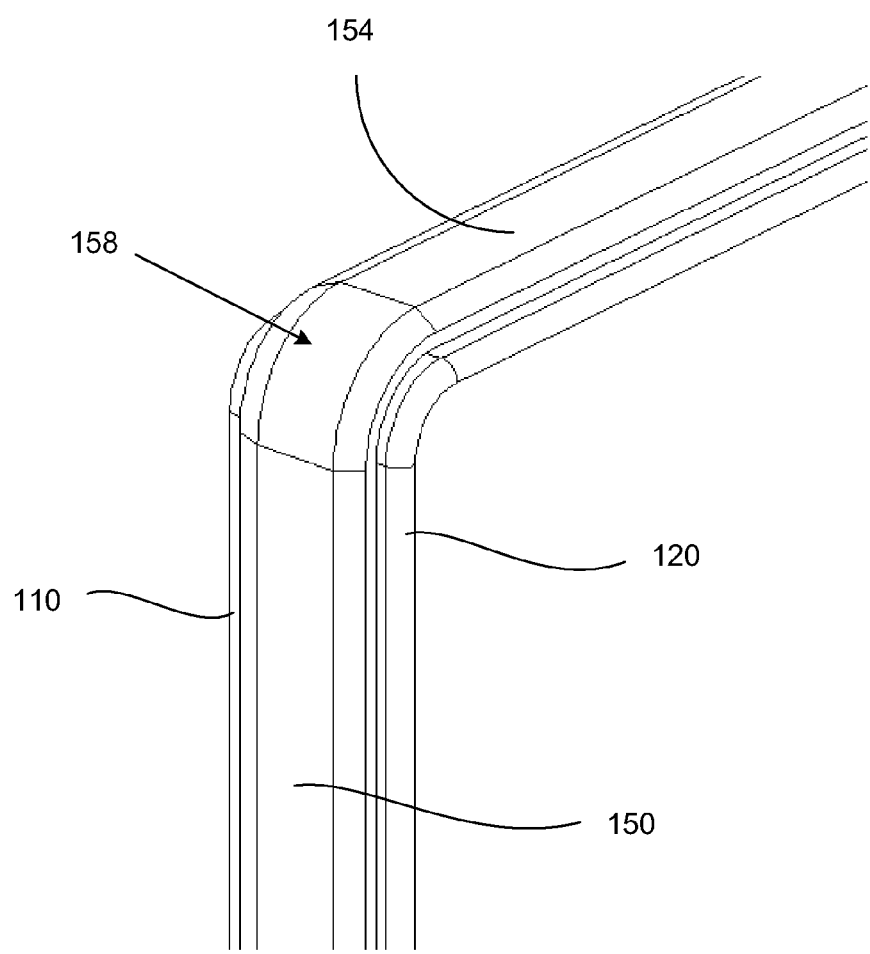
FIG. 2 shows schematically and partially a perspective view of the LCD shown in FIG. 1.

Referring to FIGS. 1 and 2, and particularly to FIG. 1, the LCD 100 includes a front frame 110 having a body portion 111 and a flange 112 bent from the body portion 111 and a rear cover 120 having a body portion 121 and a flange 122 bent from the body portion 121. The rear cover 120 and front frame 110 spatially face each other to define a housing 180 therebetween. The front frame 110 and the rear cover 120 are made of a metal material such as aluminum, or a plastic material.

The LCD 100 also includes an LC panel 130 placed in the housing 180 and supported by the front frame 110, a backlight 140 positioned between the LC panel 130 and the rear cover 120, and a backlight frame 150 engaged with the front frame 110, the rear cover 120, the LC panel 130 and the backlight 140. In addition, the LCD 100 also has a heat dissipating member 170 positioned in contact with a driving circuit 144 of the backlight 140 and the rear cover 120 for dissipating heat generated in the housing 180.

The backlight 140 includes, but not limited to, a light guiding plate 142 positioned in relation to the LC panel 120, a light source 143 optically coupled to the light guiding plate 142 and the driving circuit 144 electrically coupled to the light source 143. The backlight 140 may also include a plurality of optical films 141 optically coupled the light guiding plate 142. The light source 143 can be of LED lights, fluorescent lamps, or the like. In this exemplary embodiment as shown in FIG. 1, the light source 143 is provided at a lateral side of the light guiding plate 142 for providing light to be transmitted through the light guiding plate 142 to the LC panel 130 for image displaying.

The backlight frame 150 has a first engaging structure 151 and a second engaging structure 152 defining a frame body 153 therebetween. The first engaging structure 151 is configured to receive the flanges 112 and 122 of the front frame 110 and the rear cover 120 and retain them therein. The second engaging structure 152 is configured to retain the backlight 140 and the LC panel 130 in the housing 180. The frame body 153 is adapted for supporting the body portion 111 of the front frame 110.

As shown in FIG. 1, the first engaging structure 151 has a head portion 154, a shoulder portion 156 extending from the frame body 153, and a neck portion 152 vertically connected between the head portion 154 and the shoulder portion 156, thereby defining a first groove 157 and a second groove 158 between the head portion 154 and the shoulder portion 156. The first groove 157 is separated from the second groove 158 by the neck portion 155. The first and second grooves 157 and 158 are configured to receive the flange 112 of the front frame 110 and the flange 122 of the rear cover 120, respectively, and retain them therein. As such, the head portion 154 is positioned outside the housing 180, while the shoulder portion 156 is positioned inside the housing 180.

According to the present invention, the head portion 154 can be formed to have a desired profile, such as an arc profile, a sloped profile, an angled profile, a streamline profile or the like, for improving the appearance of the LCD 100. For example, in the embodiment shown in FIG. 1, the head portion 154 has a sloped profile at corners 154a and 154b. The head portion 154 may also be formed to have one or more decorative patterns. Additionally, the head portion 154 can be painted in a desired color.

Figure 4:
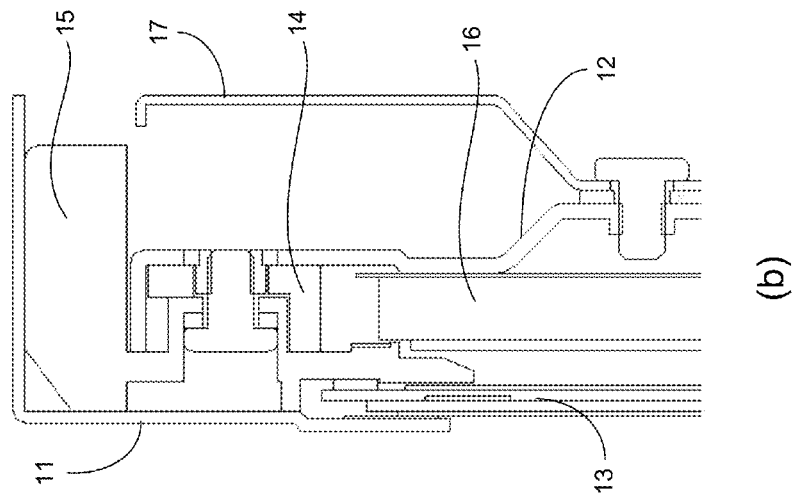
FIG. 4 shows schematically a conventional LCD, (a) a perspective view, (a) a partially cross-sectional view along with the A-A' line, and (c) a partially perspective view.
Figure 4:
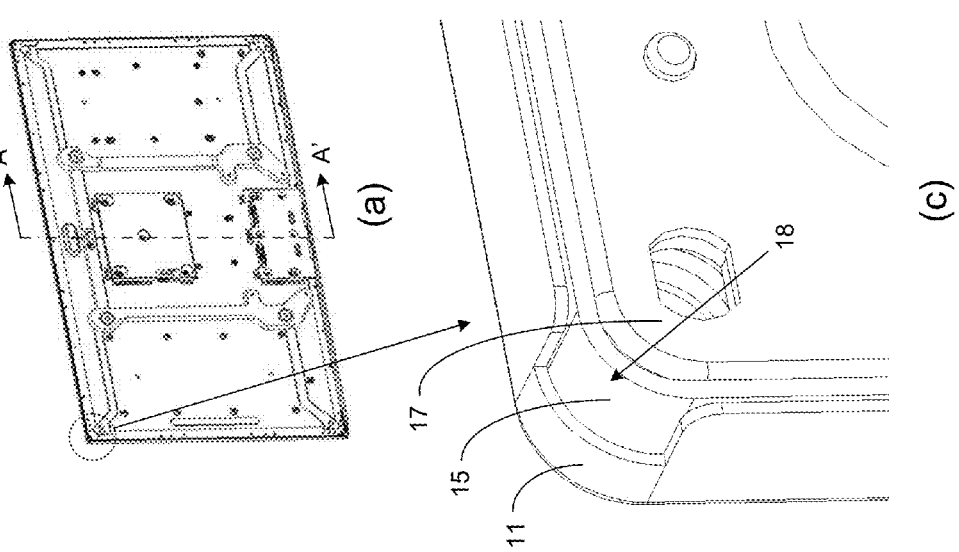

As shown in FIG. 2, each corner 158 of the LCD 100 is formed smoothly, and no portion of the front frame 110 and the rear cover 120 is cut and/or exposed. Accordingly, the LCD 100 of the present invention has advantages over the conventional LCD 10 shown in FIG. 4.

According to the present invention, the backlight frame 158 can be made of one or more elastic materials. The one or more elastic materials include plastic. One exemplary plastic material includes rubber. Further, the first engaging structure 151, the frame body 153 and the engaging structure 152 of the backlight frame 150 can be formed with the same elastic material or substantially different elastic materials or colored in different colors.

The backlight frame 158 is integrally formed by injection molding, or other methods.

Figure 3:
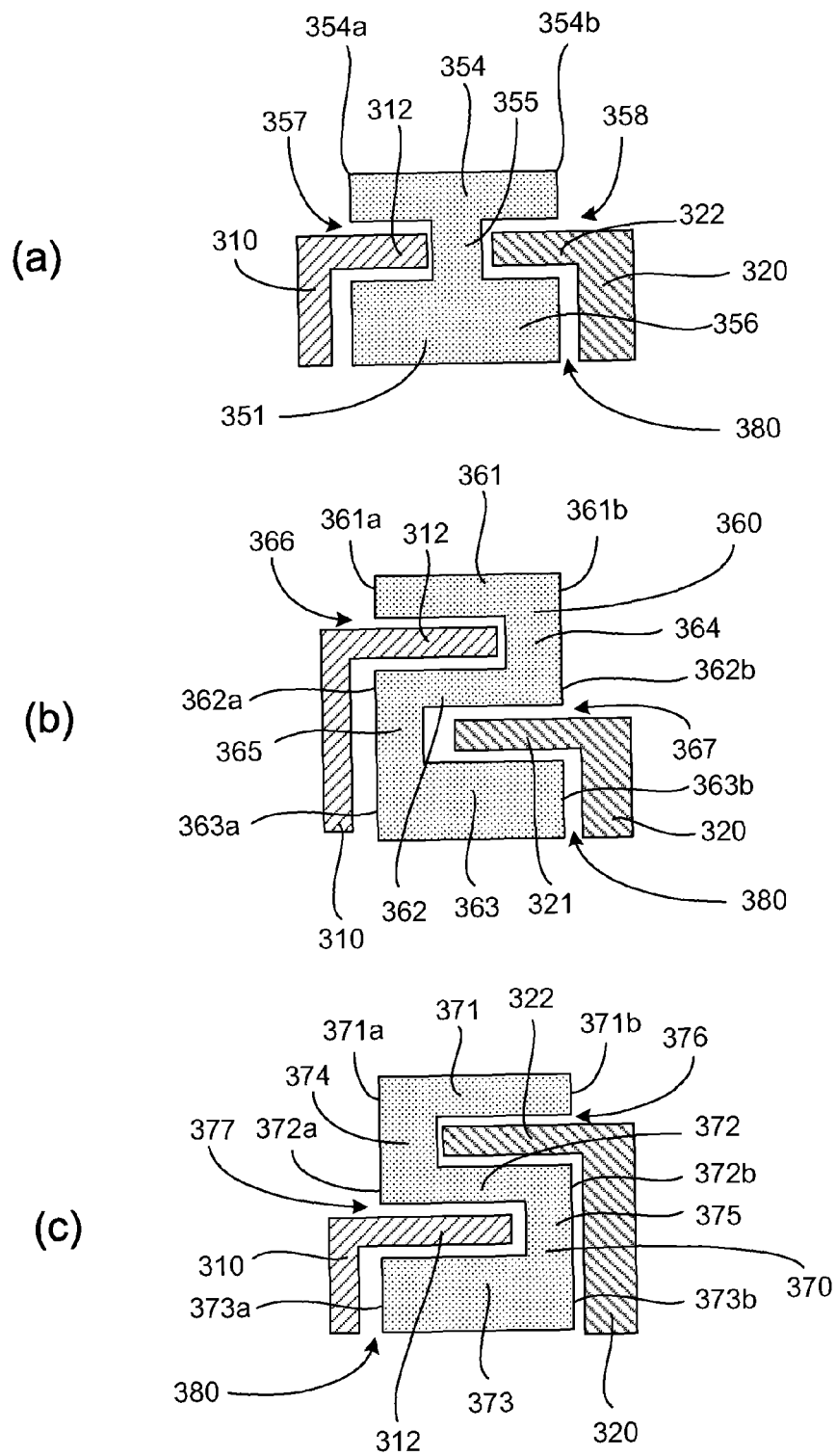
FIG. 3 shows schematically and partially cross-sectional views of an LCD according to various embodiments of the present invention.

Referring to FIG. 3, three different embodiments of the first engaging structure are respectively shown.

As shown in FIG. 3(a), the first engaging structure 351 is structurally similar to the first engaging structure 151 shown in FIG. 1, and includes a head portion 354, a shoulder portion 356 extending from the frame body (not shown), and a neck portion 352 vertically connected between the head portion 354 and the shoulder portion 356, so that a first groove 357 and a second groove 358 are defined between the head portion 354 and the shoulder portion 356, and separated by the neck portion 355. The first and second grooves 357 and 358 are adapted for receiving the flange 312 of the front frame 310 and the flange 322 of the rear cover 320, respectively, and retaining them therein. Accordingly, as assembled, the head portion 354 is positioned outside the housing 380, while the shoulder portion 356 is positioned inside the housing 380.

In this exemplary embodiment, the head portion 354 has an angled profile at corners 354a and 354b. People skilled in the art would appreciate that the head portion 354 can also be formed in other profiles, like a sloped profile, a streamline profile or the like.

FIG. 3(b) shows the first engaging structure 360 according to another embodiment of the present invention. The first engaging structure 360 has a first horizontal portion 361, a second horizontal portion 362 and a third horizontal portion 363 spatially and horizontally arranged, and a first vertical portion 364 and a second vertical portion 365 spatially and vertically arranged. The first vertical portion 360 is vertically connected between the second ends 361b and 362b of the first and second horizontal portions 361 and 362 to define a first groove 366 therein. The second vertical portion is vertically connected between the first ends 362a and 363a of the second and third horizontal portions 362 and 363 to define a second groove 367 therein. The first and second grooves 366 and 367 are configured to receive the flanges 312 and 322 of the front frame 310 and the rear cover 320, respectively. As such, the first horizontal portion 361 is positioned outside the housing 380, while the third horizontal portion 363 is positioned inside the housing 380.

FIG. 3(c) shows the first engaging structure 370 according to an alternative embodiment of the present invention. The first engaging structure 370 has a first horizontal portion 371, a second horizontal portion 372 and a third horizontal portion 373 spatially and horizontally arranged, and a first vertical portion 374 and a second vertical portion 375 spatially and vertically arranged. The first vertical portion 370 is vertically connected between the first ends 371a and 372a of the first and second horizontal portions 371 and 372 to define a first groove 376 therein. The second vertical portion is vertically connected between the second ends 372b and 373b of the second and third horizontal portions 372 and 373 to define a second groove 377 therein. The first and second grooves 376 and 377 are adapted for receiving the flanges 322 and 312 of the rear cover 320 and the front frame 310, respectively. As assembled, the first horizontal portion 371 is positioned outside the housing 380, while the third horizontal portion 373 is positioned inside the housing 380.

Similarly, the first horizontal portion 361 or 371 can be formed in a sloped profile, a streamline profile, an angled profile or the like for improving the appearance of the LCD.

Briefly, the present invention, among other things, recites an LCD with a backlight frame structure having a front groove and a rear groove configured to receive a front frame and a rear cover, respectively, of the LCD and retain them therein. Furthermore, the exterior portion of the backlight frame structure can be formed in a sloped profile, a streamline profile, an angled profile or the like for improving the appearance of the LCD. Accordingly, the LCD of the present invention has advantages over the conventional LCD.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal display (LCD), comprising:
   (a) a front frame having a body portion and a flange bent from the body portion;
   (b) a rear cover having a body portion and a flange bent from the body portion, wherein the rear cover and front frame spatially face each other to define a housing therebetween;
   (c) a liquid crystal (LC) panel placed in the housing;
   (d) a backlight positioned between the LC panel and the rear cover; and
   (e) a backlight frame having a first engaging structure and a second engaging structure defining a frame body therebetween, wherein the first engaging structure is configured to receive the flanges and of the front frame and the rear cover, and the second engaging structure is configured to retain the backlight and the LC panel in the housing, wherein the first engaging structure comprises a first horizontal portion, a second horizontal portion and a third horizontal portion spatially and horizontally arranged, and a first vertical portion and a second vertical portion spatially and vertically arranged, each of the first, second and third horizontal portions having a first end and an opposite, second end.

2. The LCD of claim 1, wherein the first vertical portion is connected between the second ends of the first and second horizontal portions to define a first groove therein, and the second vertical portion is connected between the first ends of the second and third horizontal portions to define a second groove therein, and wherein the first and second grooves are configured to receive the flanges of the front frame and the rear cover, respectively, such that the first horizontal portion is positioned outside the housing, while the third horizontal portion is positioned inside the housing.

3. The LCD of claim 1, wherein the first vertical portion is connected between the first ends of the first and second horizontal portions to define a first groove therein, and the second vertical portion is connected between the second ends of the second and third horizontal portions to define a second groove therein, and wherein the first and second grooves are configured to receive the flanges of the rear cover and the front frame, respectively, such that the first horizontal portion is positioned outside the housing, while the third horizontal portion is positioned inside the housing.

4. The LCD of claim 1, wherein the first horizontal portion has at least one of an arc profile, a streamline profile, a sloped profile and an angled profile.

5. The LCD of claim 1, wherein the backlight frame is made of one or more elastic materials.

6. The LCD of claim 5, wherein the one or more elastic materials comprise plastic.

7. The LCD of claim 6, wherein the one or more elastic materials comprise rubber.

8. The LCD of claim 5, wherein the one or more elastic materials are paintable.

9. The LCD of claim 5, wherein the first engaging structure, the frame body and the engaging structure of the backlight frame are made of an identical elastic material or substantially different elastic materials.

10. The LCD of claim 5, wherein the backlight frame is integrally formed by injection molding.

11. The LCD of claim 1, wherein each of the front frame and the rear cover is made of metal or plastic.

12. The LCD of claim 1, wherein the backlight comprises a light guiding plate positioned in relation to the LC panel, a light source optically coupled to the light guiding plate and a driving circuit electrically coupled to the light source.

13. The LCD of claim 12, wherein the backlight further comprises a plurality of optical films optically coupled the light guiding plate.

14. The LCD of claim 1, further comprising a heat dissipating member positioned in contact with the driving circuit of the backlight and the rear cover.

* * * * *